US012721250B2

(12) United States Patent
Romanowski et al.

(10) Patent No.: US 12,721,250 B2
(45) Date of Patent: Sep. 1, 2026

(54) AUTOMATIC HEADER LATCH

(71) Applicant: CNH Industrial America LLC, New Holland, PA (US)

(72) Inventors: Ryan Romanowski, New Holland, PA (US); Cory Hunt, New Holland, PA (US); Jonathan Eaby, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 728 days.

(21) Appl. No.: 18/144,731

(22) Filed: May 8, 2023

(65) Prior Publication Data

US 2024/0373774 A1 Nov. 14, 2024

(51) Int. Cl.
*A01B 59/06* (2006.01)
*A01B 59/00* (2006.01)

(52) U.S. Cl.
CPC .......... *A01B 59/006* (2013.01); *A01B 59/064* (2013.01)

(58) Field of Classification Search
CPC .. A01B 59/006; A01B 59/064; A01D 41/145; Y10T 292/1043; Y10T 292/1063; Y10T 292/702; E05C 3/00; E05B 15/0093; E05B 15/021
See application file for complete search history.

(56) References Cited

U.S. PATENT DOCUMENTS

| | | | | |
|---|---|---|---|---|
| 3,599,411 | A | 8/1971 | Scarnato et al. | |
| 5,243,810 | A | 9/1993 | Fox et al. | |
| 7,347,277 | B2 | 3/2008 | Enns et al. | |
| 9,723,785 | B2 * | 8/2017 | Ritter | A01D 41/16 |
| 2017/0234037 | A1 * | 8/2017 | Cassou | E05B 63/18 292/163 |
| 2018/0255707 | A1 | 9/2018 | Solimar Walter | |
| 2021/0307233 | A1 * | 10/2021 | Lyons | A01B 73/005 |

FOREIGN PATENT DOCUMENTS

EP 3 090 623 A1 11/2016

* cited by examiner

*Primary Examiner* — Kimberly S Berona
(74) *Attorney, Agent, or Firm* — Foley & Lardner LLP

(57) ABSTRACT

Systems, apparatuses, and methods include relate to an automatic header latch for an agricultural vehicle. The automatic header latch includes a housing link configured to couple a header to the agricultural vehicle, a channel formed in the housing link, a pin configured to be received through the channel, and a locking assembly coupled to the housing link. The locking assembly includes a rocking bracket, a diverting bracket hingedly coupled to the rocking bracket, and a fastener. The rocking bracket actuates between a loaded and an unloaded position, and is hingedly coupled to the diverting bracket. The fastener secures the rocking bracket in the loaded position, until the rocking bracket is actuated into the unloaded position by movement of the pin relative to the housing link. Following each full-raise actuation of the header, the automatic header latch is configured to alternate between a locked state and an unlocked state.

18 Claims, 7 Drawing Sheets

404
424
464
410
428
420
460
448
406
412
436

408
464
410
406
460
448
412
436

408
B
466
452
464
410
448
460
468
424
456
436

AUTOMATIC HEADER LATCH

BACKGROUND

The present disclosure relates generally to agricultural vehicles and locking mechanisms for implements of the same. More specifically, the present disclosure relates to an apparatus and method for an automatic header latch configured to alternate between a locked and unlocked state on successive full-raise actuations of a header coupled to an agricultural machine.

SUMMARY

One embodiment relates to an automatic header latch for an agricultural vehicle. The automatic header latch includes a housing link configured to couple a header to the agricultural vehicle, a channel formed in the housing link, a pin configured to be received through the channel, and a locking assembly coupled to the housing link. The locking assembly includes a rocking bracket, a diverting bracket hingedly coupled to the rocking bracket, and a fastener. The rocking bracket actuates between a loaded and an unloaded position, and is hingedly coupled to the diverting bracket. The fastener secures the rocking bracket in the loaded position, until the rocking bracket is actuated into the unloaded position by movement of the pin relative to the housing link. Following each full-raise actuation of the header, the automatic header latch is configured to alternate between a locked state and an unlocked state.

Another embodiment relates to an automatic header latch for an agricultural vehicle. The automatic header latch includes a housing link configured to couple a header to the agricultural vehicle, a channel formed in the housing link, a pin configured to be received through the channel, and a locking assembly coupled to the housing link. The locking assembly includes a rocking bracket, a diverting bracket hingedly coupled to the rocking bracket, a first fastener, and a second fastener. The rocking bracket actuates between a loaded and an unloaded position. The first fastener secures the rocking bracket in the loaded position until the rocking bracket is actuated into the unloaded position by movement of the pin relative to the housing link. The second fastener secures the rocking bracket in the unloaded position until the rocking bracket is actuated into the loaded position by reversing the movement of the pin relative to the housing link. Following each full-raise actuation of the header, the automatic header latch is configured to alternate between a locked state and an unlocked state.

Still another embodiment relates to a method for automatically locking and unlocking an automatic header latch via successive full-raise actuations of a header. The method includes coupling the header to an agricultural vehicle, moving a pin from an operating position to a full-raise position in response to a first raising of the header, moving the pin from the full-raise position to a locked position in response to a first lowering of the header, moving the pin from the locked position to the full-raise position in response to a second raising of the header, and moving the pin from the full-raise position to the operating position in response to a second lowering of the header. With each successive full-raise actuation of the header, the automatic header latch alternates between a locked state and an unlocked state.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
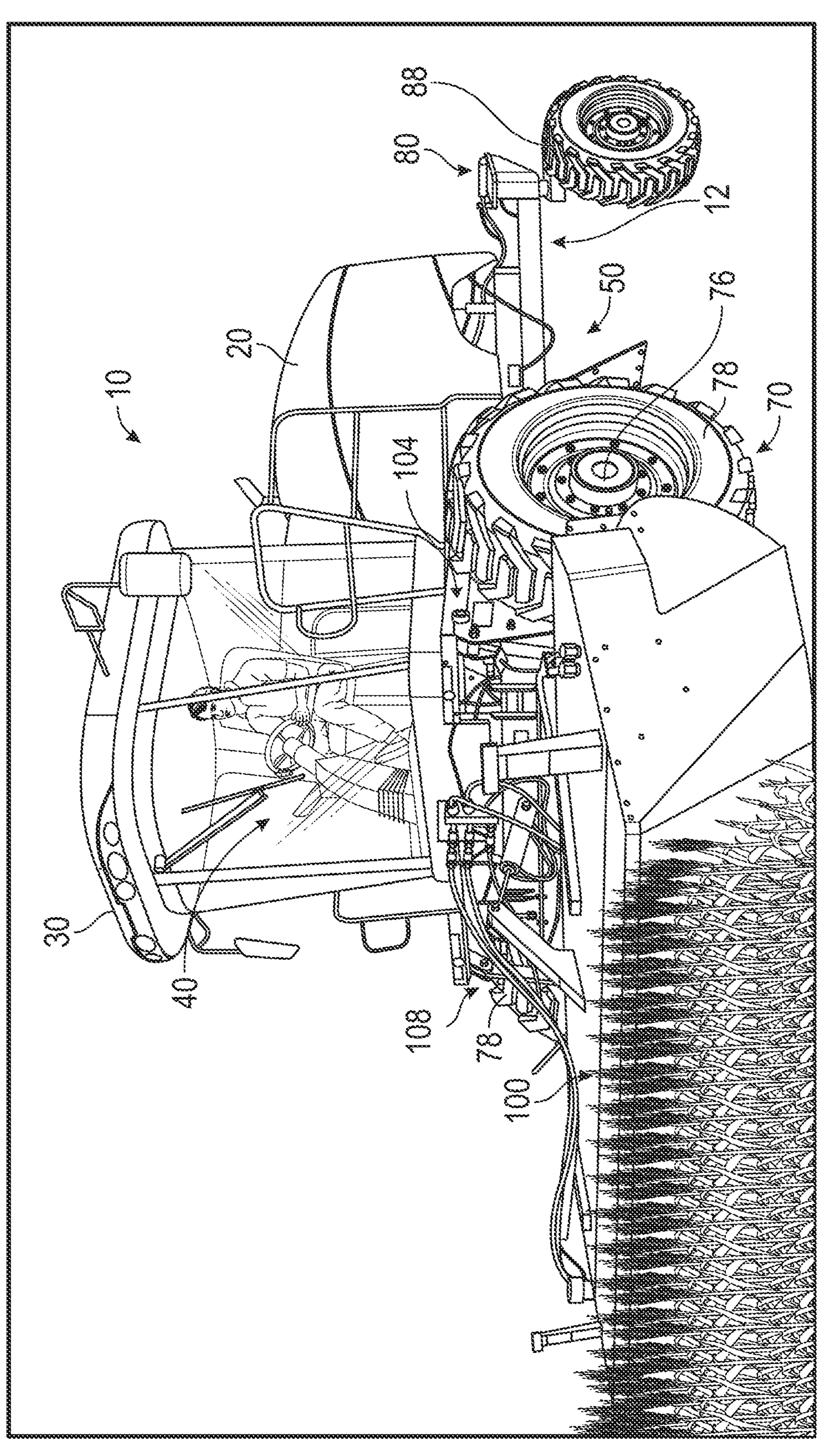
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an automatic header latch of the present disclosure is provided, for example, in a link and flotation system of a header coupled to an agricultural vehicle. The automatic header latch automatically engages a pin into a locked position upon a full-raise actuation of the agricultural vehicle, and automatically engages the pin into an unlocked position (e.g., an operating position) upon a consecutive full-raise actuation of the agricultural vehicle. When the header is coupled to the agricultural vehicle, the vehicle may raise or lower the header between a full-raise height and a minimum height depending on the desired header use. For example, the header may be lowered to an operational height where the pin of the automatic header latch is in the operating position while the agricultural vehicle is operating/harvesting/cutting/collecting/etc. a crop (e.g., the automatic header latch is in an unlocked state). Similarly, the header may be raised to a full-raise height and/or a locked height higher than the operational height. The full-raise height and/or the locked height allows the header to avoid contact with the ground, avoid disturbing the crop, or allow the header to remain fixed while the vehicle/header is serviced or repaired.

The automatic header latch of the present disclosure is configured to alternate between a locked state and unlocked state (e.g., configured to serve as a lockout system of the header and agricultural vehicle) after each successive full-raise actuation of the vehicle. For example, locking the automatic header latch is accomplished by raising the header to a full-raise position then lowering the header; in the same way, unlocking the automatic header latch is accomplished by again raising the header to a full-raise position then lowering the header. In this way, each successive full-raise actuation automatically engages or disengages the automatic header latch and/or the lockout system of the vehicle. The automatic header latch of the present disclosure includes a housing link configured to couple the header to the agricultural vehicle (e.g., a link in the lockout system of the link and flotation system). The automatic header latch also includes a channel formed in the housing link, a pin configured to be received through the channel, and a locking assembly coupled to the housing link. The locking assembly includes a rocking bracket, a diverting bracket hingedly coupled to the rocking bracket, and a fastener arranged to move the pin relative to the housing link from a locked state to an unlocked state via successive full-raise actuations of the header as described herein. In this way, the automatic header latch improves the ease of positioning the header in a lockout position and returning the header to operational use from the locking position.

Overall Vehicle

Figure 2:
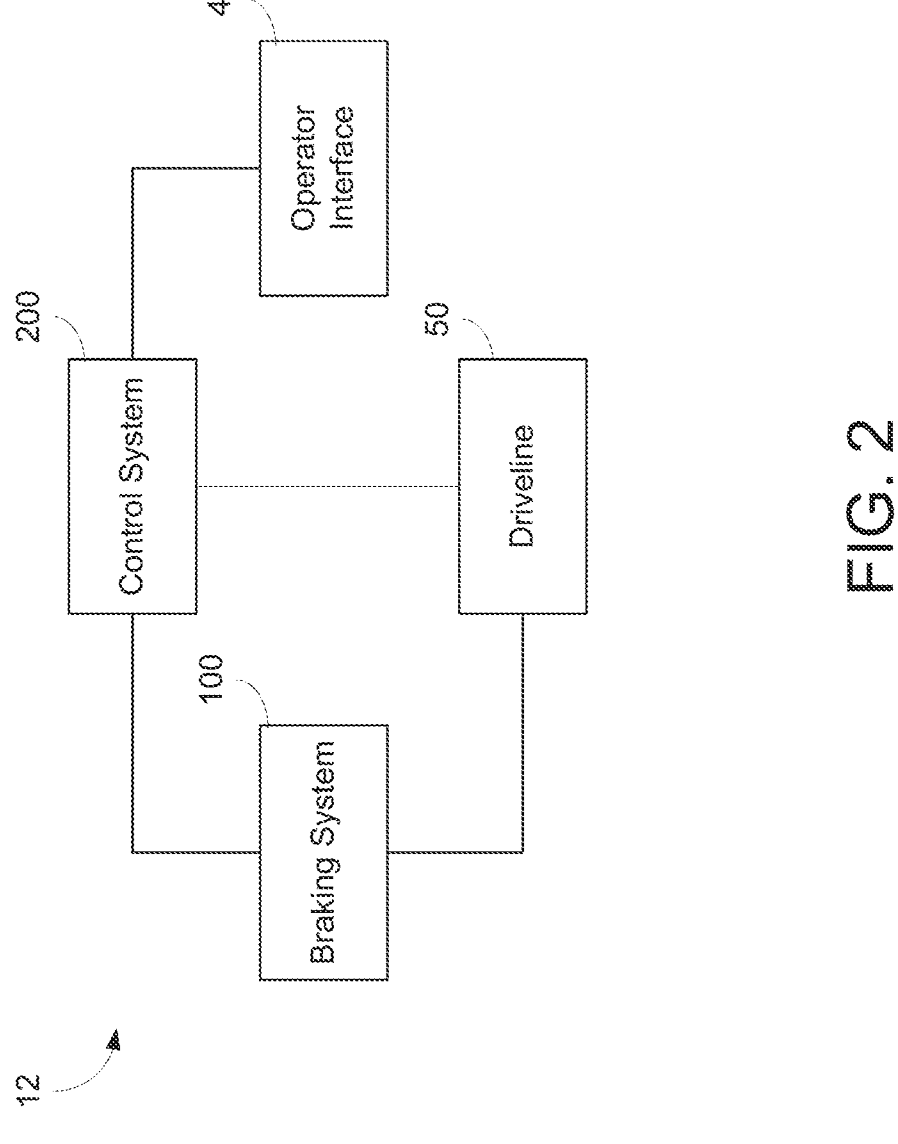
FIG. 2 is a schematic block diagram of the vehicle of FIG. 1, according to an exemplary embodiment.
Figure 3:
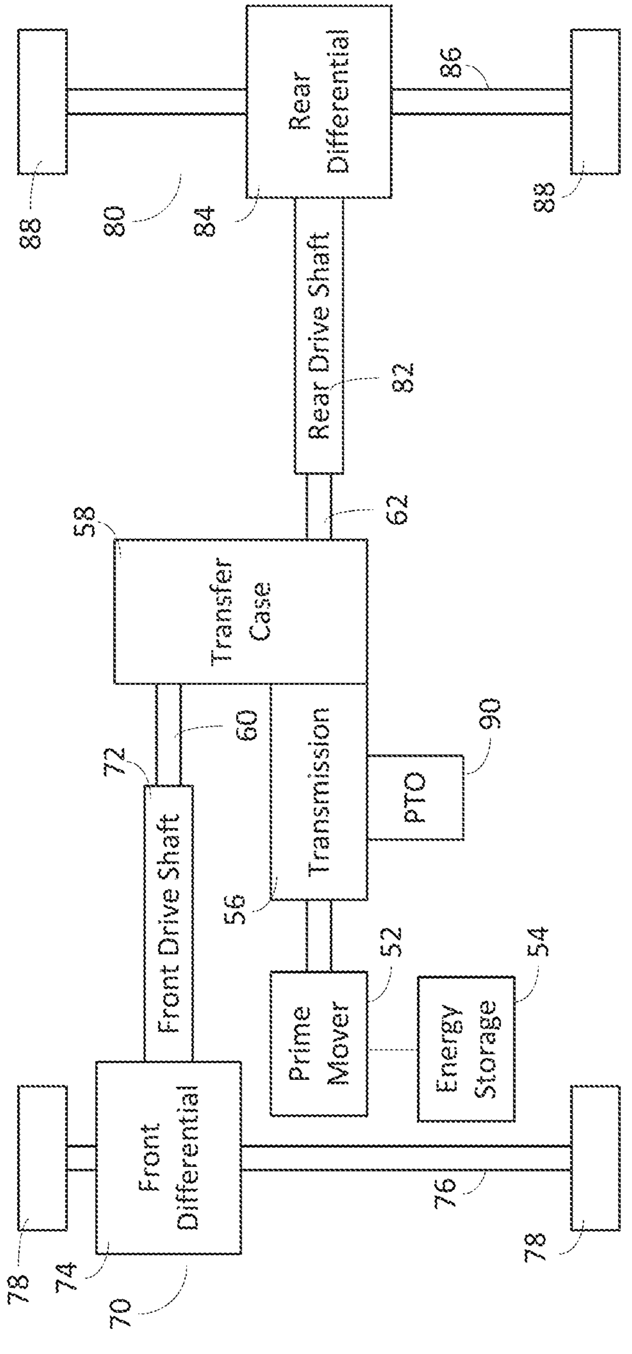
FIG. 3 is a schematic block diagram of a driveline of a vehicle, according to an exemplary embodiment.
Figure 3:

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 96, coupled to the operator interface 40, the driveline 50, and the braking system 92. In other embodiments, as shown in FIG. 3, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 56) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a windrower or swather. In other embodiments, the agricultural machine or vehicle may be a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

For example, as shown in FIG. 1, the vehicle 10 includes a header 100, which may be a windrower header, disc header, sickle header, and the like. In some embodiments, the header 100 includes a draper header, a combine header, a pickup-header, a corn header, etc. The header 100 is moveably coupled to the front of the vehicle 10 via a link and flotation system 104. The link and flotation system 104 allows the header 100 to be raised (e.g., actuated between a full-raise position wherein the vehicle 10 raises the header 100 to a maximum height from the ground) and lowered (e.g., lowered until the header 100 contacts the ground, lowered until the header 100 floats above the ground, lowered until the header 100 is in position to cut/collect/interact with a crop). The header 100 includes a lockout system 108, which is used to lock the header 100 in a raised position, such as a full-raise position, a height above a crop-cutting height, etc. For example, the lockout system 108 may be used to lock the header in an upright position while the vehicle 10 is travelling to prevent the header 100 from contacting the ground, disturbing cut crop, etc. Additionally, the lockout system 108 may lock the header in an upright position so that maintenance and servicing can safely be done to the components of the header 100.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc. In some embodiments, the operator interface 40 is configured to raise and lower the header 100. For example, the operator interface 40 may be used lower the header 100 to a designated cut height for cutting a specific crop. The link and flotation system 104 then supports the header 100 as the vehicle 10 travels, allowing the header 100 to travel over varying ground conditions (e.g., elevation changes, hills, pivot tracks, etc.) while maintaining the same cut height. In this way, the header 100 "floats" over the crop at an operating position while performing a crop harvesting operation (e.g., windrowing, cutting, collecting, combining, etc.). The operator interface 40 may be communicatively coupled to a power transfer system (e.g., a hydraulic system using hydraulic lines and cylinders) to raise, lower, actuate, etc. the header 100.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIG. 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Automatic Header Latch

Figure 4:
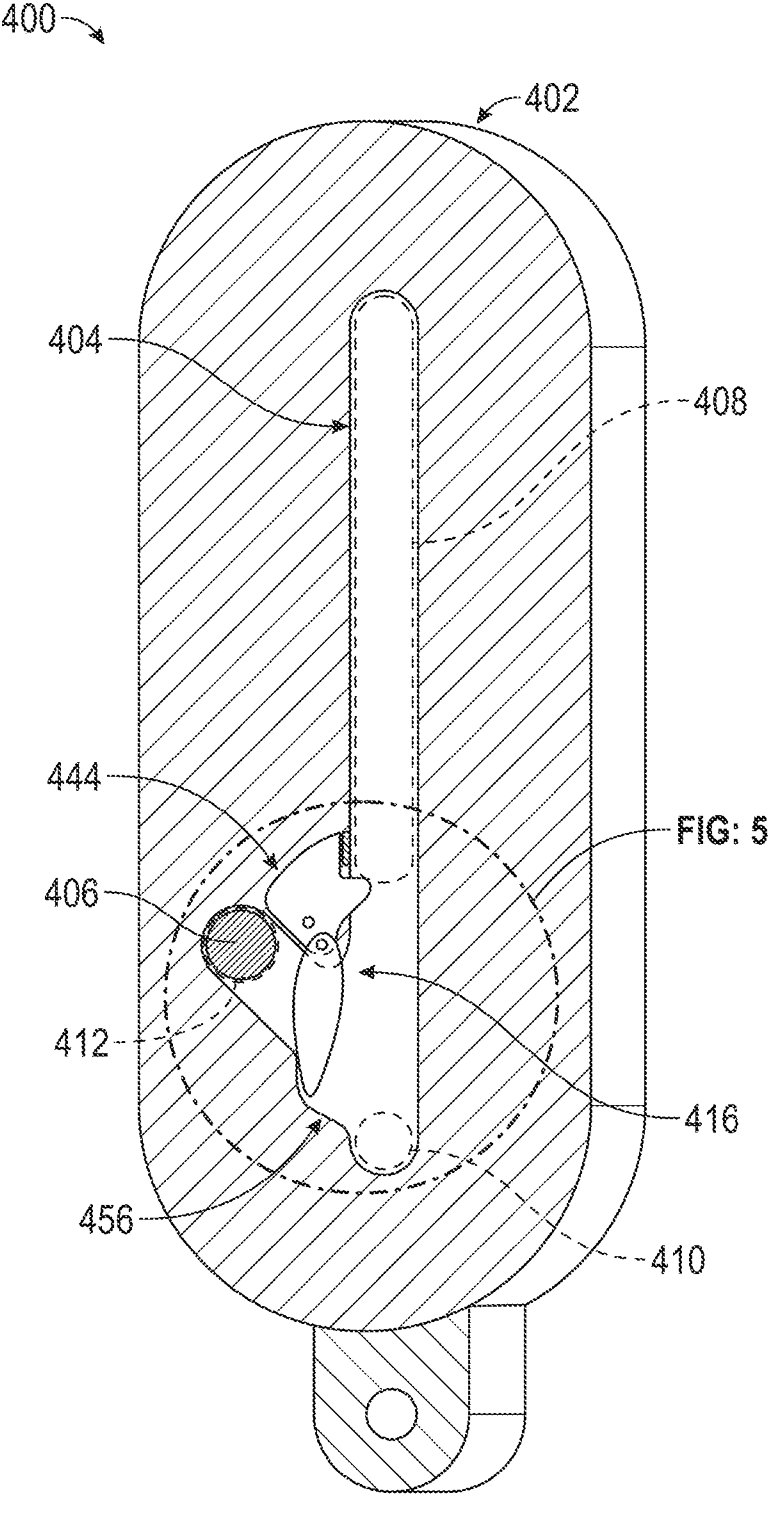
FIG. 4 is a perspective view of an automatic header latch, according to an exemplary embodiment.

Turning to FIG. 4, an automatic header latch 400 for an agricultural vehicle includes a housing link 402. The housing link 402 may be a component of a link and flotation system 104. In some embodiments, the automatic header latch is a component of a lockout system 108, which itself is a sub-system of the link and flotation system 104 of a vehicle 10 and header 100 pairing. The housing link 402 provides a structure upon which the components of the automatic header latch 400 are formed. The housing link 402 may be composed of iron, structural steel, aluminum, or other suitable materials. The housing link 402 may be coated with a protective layer to prevent oxidation, corrosion, etc. The housing link 402 may also be a sufficient thickness and size to support the weight of the header 100 as it is actuated between a full-raise position and a minimum position by the vehicle 10. The header 100 and the agricultural vehicle 10 may be coupled via connections or connectors affixing each to the housing link 402. In some embodiments, disconnecting the housing link 402 from either the header 100 or the agricultural vehicle 10 is necessary to decouple the header 100 from the vehicle 10. In other embodiments, the housing link 402 is an integral component of (e.g., cannot be removed without breaking one or more components, is formed together with, is permanently affixed to, etc.) the header 100 or the vehicle 10.

The automatic header latch 400 also includes a channel 404 formed in the housing link 402. The channel 404 may extend through the entire thickness/body of the housing link 402 such that a pin 406 may be received through the channel 404 (e.g., slid into the channel 404 and secured in place such that the body/shaft of the pin 406 may move relative to the channel 404 without fully leaving the channel 404). The pin 406 moves relative to the housing link 402 as the header is actuated (e.g., raised and lowered). The pin 406 may be of a suitable shape and structure to travel smoothly in the channel 404 without catching or snagging onto the siding of the channel 404 as the header 100 actuates. For example, the pin 406 may be a steel cylindrical bolt or other sturdy member capable of bearing the weight of the header 100 while the automatic header latch 400 is in a locked state. As explained herein, the pin 406 contacts/displaces/exerts a force up and moves components of the automatic header latch 400 as the header 100 is raised and lowered in order to alternate the automatic header latch 400 between a locked and unlocked state. The channel 404 provides a pathway/void/guide along which the pin 406 moves relative to the housing link 402 such that the pin 406 travels between an operating position 408, a full-raise position 410, and a locked position 412. The channel 404 may be coated with a material to reduce friction as the pin 406 travels and may be coated, lubricated, or treated to protect from corrosion, wear, or jamming of the pin 406. A protective cover or seal may be affixed to the edge of the channel 404 or partially covering portions of the channel 404 (e.g., a rubber covering with a slotted opening, a system of bristles, etc.) to prevent debris, dirt, or other contaminants from entering the channel 404 and interfering with the movement of the pin 406.

In some embodiments, while the header 100 is coupled to the vehicle 10, the pin 406 may be located in the operating position 408 of the channel 404. In such embodiments, the operating position 408 corresponds to the location of the channel 404 in which the pin 406 travels during normal operation, for example, when the header 100 is not being placed in or out of a locked state, when the header 100 is in an unlocked state, etc. For further illustration, in most embodiments, while the header 100 is engaged in an operation of cutting/harvesting/collecting a crop, the pin 406 will be located in the operating position 408. In some embodiments, the operating position 408 may include portion of the channel 404 spanning between 4 inches to 24 inches in length. In other embodiments, the length of the operating position 408 may be increased or decreased depending on the range of motion of the header 100 relative to the vehicle 10. In some embodiments, the pin 406 may be configured to remain fixed at a set location within the operating position 408 while the vehicle is engaged in an operation/task.

In some embodiments, while the header 100 is coupled to the vehicle 10, the pin 406 may be located in the full-raise position 410. The full-raise position 410 is a location of the pin 406 in the channel 404 and relative to the housing link 402 corresponding to the full-raise actuation of the vehicle 10 (e.g., when the vehicle 10 raises the header 100 to a maximum allowable height, when the vehicle 10 lifts the header 100 to a top-most position, etc.). As explained herein, when the pin 406 is moved into the full-raise position 410, the automatic header latch 400 is configured to adjust subsequently into either a locked state or an unlocked state. For further illustration, in some embodiments, to lock the automatic header latch 400, the header 100 is raised such that the pin 406 is moved into the full-raise position 410, then lowered out of the full-raise position 410. Similarly, to unlock the automatic header latch 400, the header is raised a consecutive time such that the pin 406 is moved into the full-raise position 410, then lowered out of the full-raise position 410 (e.g., raised-lowered a first time to lock, raised-lowered a second time to unlock, raised-lowered a third time to lock, raised-lowered a fourth time to unlock, etc.).

In some embodiments, while the header 100 is coupled to the vehicle 10, the pin 406 may be located in the locked position 412. The locked position 412 may correspond to a lockout state of the header 100 (e.g., the header 100 is configured to be limited in movement and not able to actuate along its full range of motion until unlocked, etc.). The pin 406 may be in the locked position 412 when the header 100 is maintenance, while the vehicle 10 is in a state of non-operational travel, etc. In further embodiments, the channel 404 may be formed in a hooked shape such that the length of the channel 404 defines an angle with the operating position 408 at one end, the locked position 412 the other end, and the full-raise position 410 at the vertex. In some embodiments, the angle formed by the channel 404 is between 15 and 75 degrees.

Figures 5, 6:
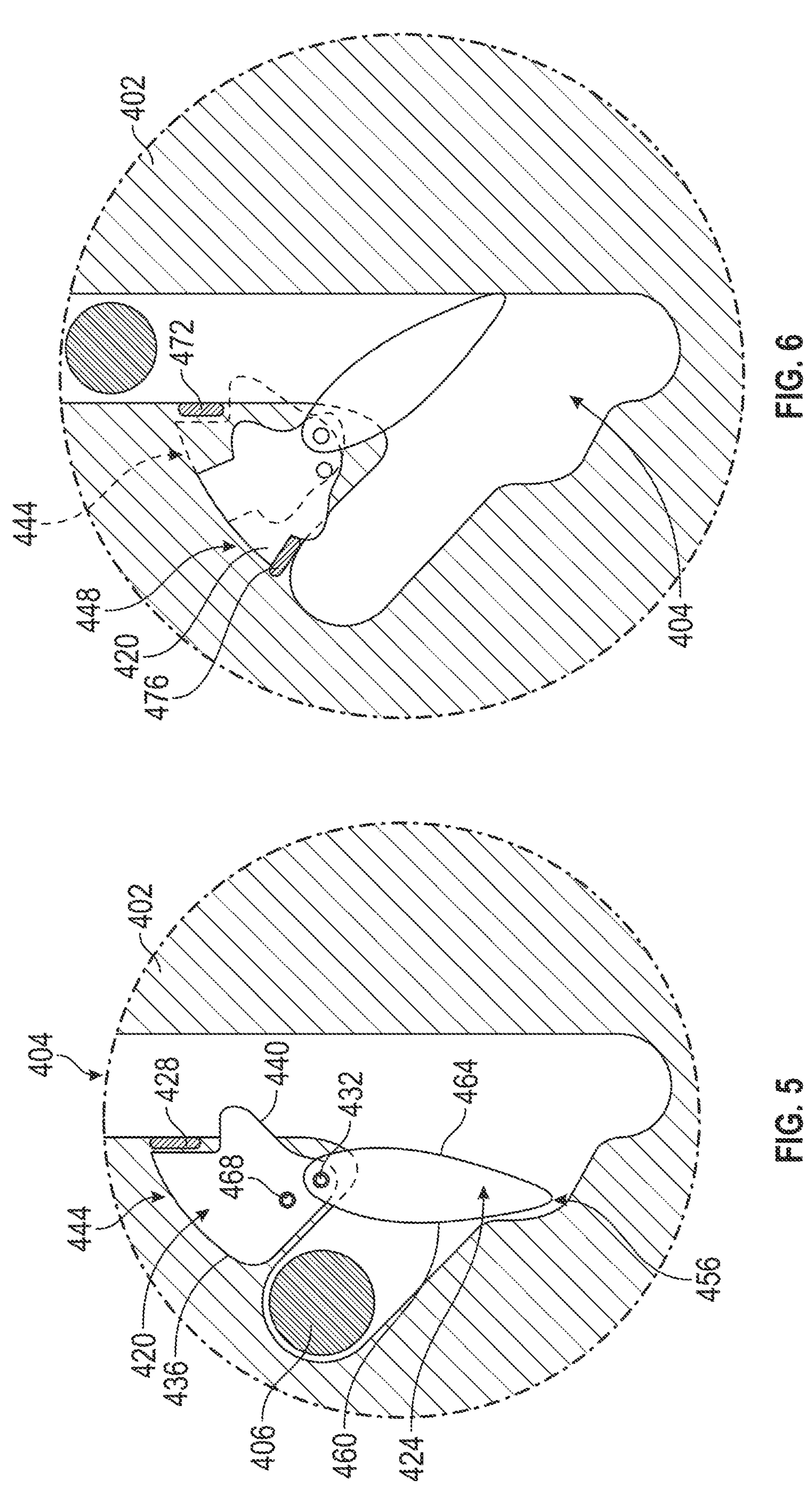
FIG. 5 is a detail view of detail A in FIG. 4, accordingly to an exemplary embodiment.
FIG. 6 is a perspective view of a locking assembly, according to an alternative exemplary embodiment.

The automatic header latch 400 also includes a locking assembly 416. The locking assembly 416 is coupled to the housing link 402. In some embodiments, components of the locking assembly 416 may abut or be located at least partially within the channel 404. In other embodiments, the locking assembly 416 may be coupled to a surface of the housing link 402 (e.g., via bolts, clamps, fasteners, welds, etc.). The locking assembly 416 may also be formed integrally with, as a part of, or placed within a cavity, slot, or recess formed in the housing link 402. Further, multiple components of the locking assembly 416 may be coupled or affixed to the housing link 402 in various manners. For example, a more detailed view of an exemplary embodiment of the locking assembly 416 is shown in FIG. 5. The locking assembly 416 includes a rocking bracket 420, a diverting bracket 424, and a fastener 428. The rocking bracket 420 is hingedly coupled to the diverting bracket 424. For example, in FIG. 5, a bolt 432 mounts the rocking bracket 420 and diverting bracket 424 to the housing link 402 such that the rocking bracket 420 and the diverting bracket 424 may at least partially rotate in the axial direction of the bolt 432. In other embodiments, the diverting bracket 424 and rocking bracket 420 may each be fixed to a pivot point coupled to the housing link 402. In other embodiments, the rocking bracket 420 and the diverting bracket 424 may be configured to slide, translate, or rotate relative to one another via geared connections or the like.

The rocking bracket 420 includes a includes a first trigger surface 436 and a second trigger surface 440 configured to actuate the rocking bracket 420 between a loaded position 444 (shown, for example, in FIGS. 4, 5, 10-12) and an unloaded position 448 (shown, for example, in FIGS. 6-9). As explained herein, the pin 406 is configured to move relative to the housing link 402 when the header 100 is actuated (e.g., raised and lowered). For example, the pin 406 may contact the first trigger surface 436 to actuate the rocking bracket 420 from the unloaded position 448 to the loaded position 444. Similarly, the pin 406 may contact the second trigger surface 440 to actuate the rocking bracket 420 from the loaded position 444 to the unloaded position 448. In this way, the pin 406 contacts and displaces the trigger surfaces of the rocking bracket 420 to set the rocking bracket 420 in alternating loaded/unloaded positions following a full-raise and lowering of the header 100, for example.

The diverting bracket 424 similarly actuates between a first position 452 (shown in FIGS. 6-9) and a second position 456 (shown in FIGS. 4, 5, 10-12). The pin 406 may also contact the diverting bracket 424 as the pin 406 moves through the channel 404. The diverting bracket 424 directs the pin 406 to either move towards the operating position 408 (e.g., when the automatic header latch 400 is toggling to an unlocked state) or move towards the locked position 412 (e.g., when the automatic header latch 400 is toggling to a locked state) when the header 100 is lowered from the full-raise height. In some embodiments, the diverting bracket 424 has a first surface 460 that directs the pin 406 towards the locked position 412 or the full-raise position 410. The diverting bracket 424 also has a second surface 464 that directs the pin 406 towards the full-raise position 410 or the operating position 408.

In some embodiments, the locking assembly 416 includes a rotational element 468 to urge the rocking bracket 420 and the diverting bracket 424 to rotate about the axis of the bolt 432 (e.g., a pin, a fastener, a fixed rod, etc.). In some embodiments, the rotational element 468 is a spring (e.g., a torsion spring, a system of coil springs). In other embodiments, the rotational element may be a piston configured to apply an alternating force to rotate rocking bracket 420, a motorized or powered connected configured to urge the rocking bracket 420 and diverting bracket apart, etc.

The locking assembly also includes a fastener 428. The fastener 428 secures the rocking bracket 420 in the loaded position 444 and allows the rocking bracket 420 to be displaced to the unloaded position 448 when the pin 406 displaces the second trigger surface 440. For example, after the pin contacts the first trigger surface 436, the rocking bracket 420 actuates (and may be assisted in part in its actuation) by the fastener 428 until the rocking bracket 420 stops in the loaded position 444. The rocking bracket 420 is then held at the loaded position 444 by the fastener 428. For example, in some embodiments, the fastener 428 is a magnet (e.g., a high strength magnet, neodymium magnet, electromagnet, etc.) that maintains the rocking bracket 420 in the loaded position 444 and creates a rotational force in the rotational element 468 (e.g., a torsion spring). In other embodiments, the fastener 428 may be a rotatable or triggerable latch/clasp actuated by movement of the pin 406 or header 100. In further embodiments, the fastener 428 may include a gripping device or adhesive surface, a stop bar triggered by a sensor, etc.

In some embodiments, rather than including a rotational element 468, the locking assembly 416 may alternatively or additionally include a first fastener 472 and a second fastener 476, as shown in FIG. 6. In this way, as the pin 406 displaces the rocking bracket 420, the rocking bracket 420 actuates from the loaded position 444 held by the first fastener 472 towards the unloaded position 448 to be held in place by the second fastener 476. In such embodiments, the first fastener 472 and the second fastener 476 may be coupled to the rocking bracket 420, the housing link 402, the surface of the channel 404, and/or variations or combinations such suitable configurations.

Method for an Automatic Header Latch

Figures 7, 8, 9:
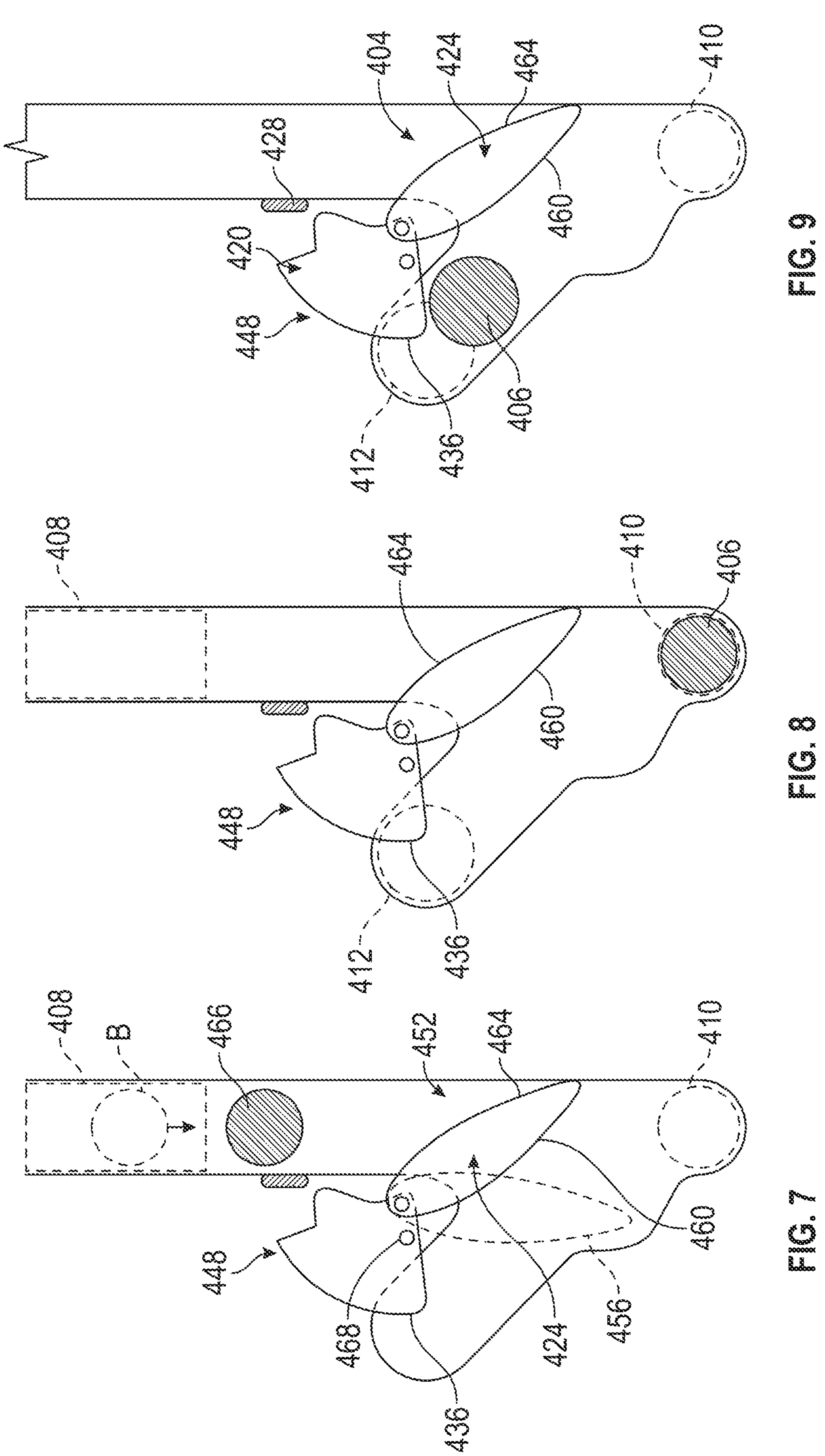
FIG. 7 is a perspective view showing an automatic header latch in an unlocked state, according to an exemplary embodiment.
FIG. 8 is a perspective view showing the automatic header latch of FIG. 7 in a first full-raise actuation state, according to an exemplary embodiment.
FIG. 9 is a perspective view showing the automatic header latch of FIG. 7 during a first lowering state, according to an exemplary embodiment.

A method for actuating an automatic header latch 400 between a locked and unlocked state via successive full-raise actuations of a header is disclosed, exemplary steps of the method shown in FIG. 7. The method includes the step of coupling the header 100 to an agricultural vehicle 10. As shown in FIG. 7, the pin 406 is initially located in the operating position 408 at exemplary position "B." However, in response to a first raising of the header 100, the pin 406 moves relative to the channel 404 such that the pin 406 moves from the operating position 408 towards the full-raise position 410. As the header 100 continues to be lifted towards the full-raise height, the pin 406 will contact the second surface 464 of the diverting bracket 424, displacing the diverting bracket 424 from the first position 452 to the second position 456. As the pin 406 displaces the diverting bracket 424, the movement of the diverting bracket 424 will create a rotational force in the rotational element 468 which will urge the diverting bracket back towards the first position 452. Once the pin 406 reaches the full-raise position 410, the pin 406 will no longer block the diverting pin (e.g., prevent the diverting bracket 424 from moving to the first position 452 as a result of the force of the rotational force, spring force, etc.). Accordingly, at the (here, first) full-raise height, the diverting bracket 424 will be displaced from the second position 456 back to the first position 452, as shown in FIG. 8.

In this way (and turning to FIG. 8), the first surface 460 of the diverting bracket 424 blocks the path of the pin 406 and directs the pin 406 towards the locked position 412 as the header 100 is lowered (e.g., brought down from the first full-raise actuation). As shown in FIG. 8, the pin 406 has reached the full-raise position 410. At this step, a first lowering of the header 100 moves the pin 406 in a reverse direction relative to the channel (e.g., back towards the operating position 408). However, as shown in FIG. 9, the first surface 460 of the diverting bracket 424 blocks the movement of the pin 406 and directs the pin 406 towards the locked position 412. Before the pin reaches the locked position 412, the pin 406 contacts the first trigger surface 436 of the rocking bracket 420 while the rocking bracket 420 is in the unloaded position 448. It will be appreciated that at this step, even if the header 100 does not lower to the locked position 412, raising the header 100 will only result in the pin 406 moving back to the full-raise position 410. Accordingly, the header 100 cannot be lowered further than the locked position 412 because the diverting bracket 424 prevents the pin 406 from re-entering the operating position 408 until a second full-raise actitation is complete (e.g., once the header 100 is raised to the full-raise height, the automatic header latch 400 will alternate to the locking state).

Figure 10:
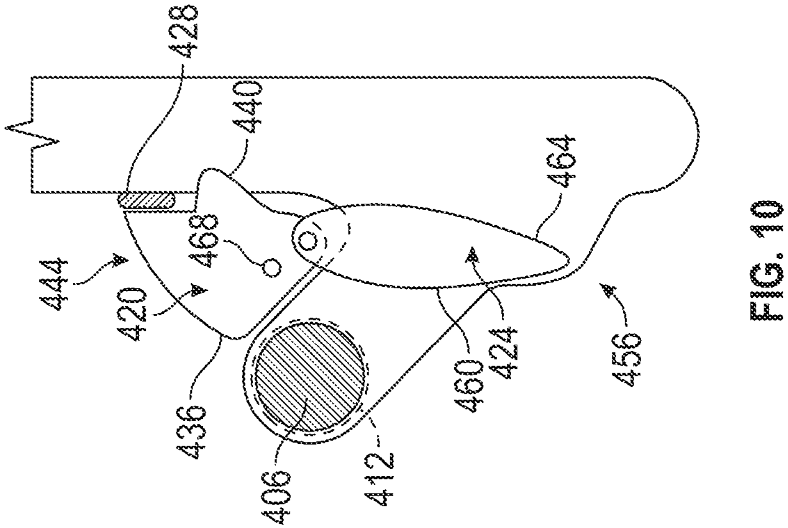
FIG. 10 is a perspective view showing the automatic header latch of FIG. 7 in a locked state, according to an exemplary embodiment.

As shown in FIG. 10, the header 100 is lowered further and the pin 406 reaches the locked position 412. In reaching the locked position 412, the pin 406 contacts and displaces the first trigger surface 436 such that the rocking bracket 420 moves to the loaded position 444, where the second trigger surface 440 of the rocking bracket 420 extends such that it partially overlaps the channel 404 and enters the path along which the pin 406 travels. The movement of the rocking bracket 420 may create tension in the rotational element 468, which actuates the diverting bracket 424 to move to the second position 456. At this step, as shown in FIG. 10, the header 100 is locked out (e.g., cannot move lower, can only be raised, etc.) because the pin 406 is blocked by the channel 404 and supports the weight of the header 100.

Figure 12:
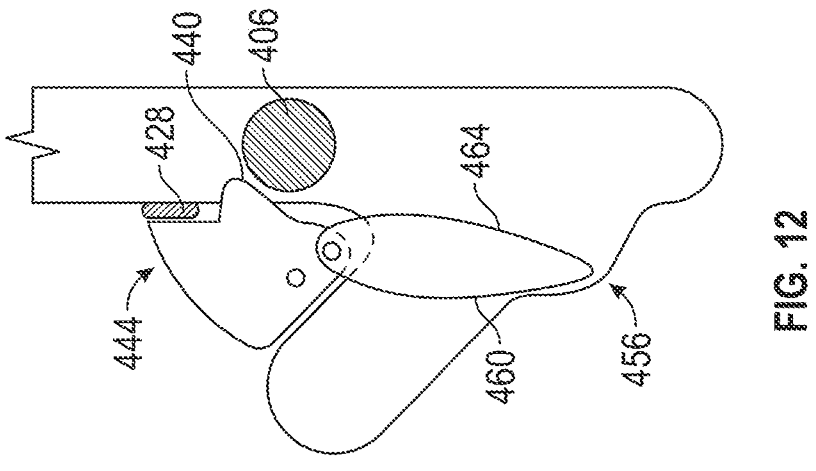
FIG. 12 is a perspective view showing the automatic header latch of FIG. 7 during a second lowering state, according to an exemplary embodiment.
Figure 11:
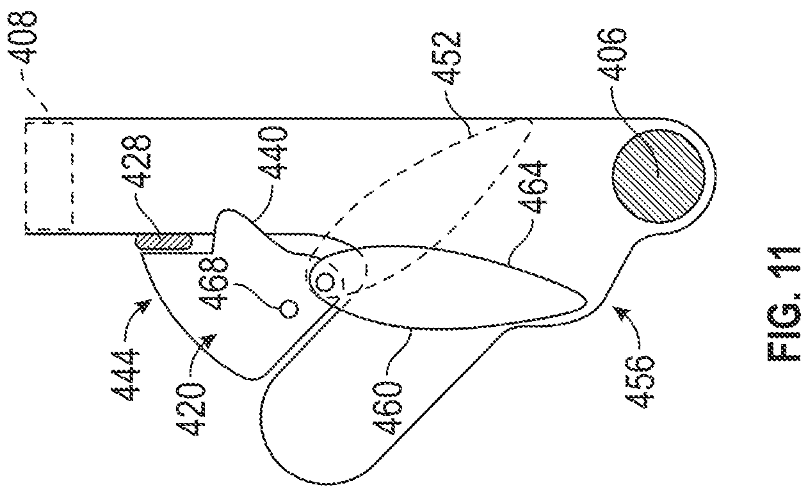
FIG. 11 is a perspective view showing the automatic header latch of FIG. 7 in a second full-raise actuation state, according to an exemplary embodiment.

As shown in FIGS. 11 and 12, the automatic header latch 400 may return to the unlocked state by a second full-raise actuation (e.g., a second raising of the header). In FIG. 11, the header is brought to a full-raise height and the pin 406 returns to the full-raise position 410. As the pin 406 approaches the full-raise position 410, the pin 406 contacts the first surface 460 of the diverting bracket 424, moving it to the first position 452 and creating tension in the rotational element 468. When the pin 406 reaches the full-raise position 410, the rotational element 468 (e.g., tension of the torsion spring, etc.) urges the diverting bracket 424 back to the second position 456. In other embodiments, gravitational force or the force/draw/presence of the second fastener 476 may direct the diverting bracket 424 to the second position 456. As shown in FIG. 11, the fastener 428 holds the rocking bracket 420 in the loaded position such that the second trigger surface 440 remains between the pin 406 and the operating position 408.

In this way, and as shown in FIG. 12, the header 100 is lowered (e.g., a second lowering of the header) and the second surface 464 of the diverting bracket 424 blocks the path of the pin 406 and allows the pin 406 to only re-enter the operating position 408. As the header 100 is lowered, the pin 406 contacts the second trigger surface 440 of the rocking bracket 420. The pin 406 moves to the operating position 408, and actuates the rocking bracket 420 such any force coupling the rocking bracket 420 to the fastener 428 is overcome, and the rocking bracket 420 returns to the unloaded position 448. Accordingly, the pin 406 re-enters the operating position 408, the automatic header latch 400 is set to the unlocked state, and the automatic header latch is reconfigured back in the position shown in FIG. 7. In some embodiments, successively raising the header 100 to the full-raise height then lowering the header 100 results in the automatic header latch 400 cycling through the positions shown in FIGS. 7-12 (e.g., automatically alternating between locked and unlocked states triggered by raising the header 100 to the full-raise height).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the control system 96, etc.) as shown in the various exemplary embodiments is illustrative only. Additionally, any element disclosed in one embodiment may be incorporated or utilized with any other embodiment disclosed herein.

What is claimed is:

1. An automatic header latch for an agricultural vehicle, the automatic header latch comprising:
- a housing link configured to couple a header to the agricultural vehicle;
- a channel formed in the housing link;
- a pin configured to be received through the channel;
- a locking assembly coupled to the housing link, the locking assembly comprising:
  - a rocking bracket, the rocking bracket configured to actuate between a loaded position and an unloaded position,
  - a diverting bracket hingedly coupled to the rocking bracket,
  - a fastener, the fastener configured to secure the rocking bracket in the loaded position;
- wherein, following each full-raise actuation of the header, the automatic header latch is configured to alternate between a locked state and an unlocked state.

2. The automatic header latch of claim 1, wherein the channel is hook-shaped and defines an operating position, a full-raise position, and a locked position for the pin.

3. The automatic header latch of claim 1, wherein the rocking bracket includes a first trigger surface and a second trigger surface.

4. The automatic header latch of claim 3, wherein the pin is configured to actuate the rocking bracket from the unloaded position to the loaded position by displacing the first trigger surface.

5. The automatic header latch of claim 3, wherein the pin is configured to actuate the rocking bracket from the loaded position to the unloaded position by displacing the second trigger surface.

6. The automatic header latch of claim 1, further comprising:
- a spring configured to urge the rocking bracket to the unloaded position.

7. The automatic header latch of claim 2, wherein the operating position is a portion of the channel between 4 and 24 inches in length.

8. An automatic header latch for an agricultural vehicle, the automatic header latch comprising:
- a housing link configured to couple a header to the agricultural vehicle;
- a channel formed in the housing link;
- a pin configured to be received through the channel;
- a locking assembly coupled to the housing link, the locking assembly comprising:

a rocking bracket, the rocking bracket configured to actuate between a loaded position and an unloaded position, a diverting bracket hingedly coupled to the rocking bracket, a first fastener, the first fastener configured to secure the rocking bracket in the loaded position, a second fastener, the second fastener configured to secure the rocking bracket in the unloaded position;

wherein, following each full-raise actuation of the header, the automatic header latch is configured to alternate between a locked state and an unlocked state.

9. The automatic header latch of claim 8, wherein the channel is a hook-shaped channel defining an operating position, a full-raise position, and a locked position for the pin.

10. The automatic header latch of claim 8, wherein the rocking bracket includes a first trigger surface and a second trigger surface.

11. The automatic header latch of claim 10, wherein the pin is configured to actuate the rocking bracket from the unloaded position to the loaded position by displacing the first trigger surface.

12. The automatic header latch of claim 10 wherein the pin is configured to actuate the rocking bracket from the loaded position to the unloaded position by displacing the second trigger surface.

13. The automatic header latch of claim 9, wherein the operating position is a portion of the channel between 4 and 24 inches in length.

14. A method for automatically locking and unlocking a header latch via successive full-raise actuations of a header, the method comprising:

coupling the header to an agricultural vehicle;

in response to a first raising of the header, moving a pin from an operating position to a full-raise position;

in response to a first lowering of the header, moving the pin from the full-raise position to a locked position;

in response to a second raising of the header, moving the pin from the locked position to the full-raise position;

in response to a second lowering of the header, moving the pin from the full-raise position to the operating position; and in response to moving the pin from the full-raise position to the locked position, actuating a rocking bracket from an unloaded position to a loaded position.

15. The method of claim 14, further comprising:

in response to moving the pin from the locked position to the full-raise position, actuating a diverting bracket from a second position to a first position then back to the second position.

16. The method of claim 14, further comprising:

in response to moving the pin from the full-raise position to the operating position, actuating a rocking bracket from the loaded position to the unloaded position.

17. The method of claim 14, further comprising:

in response to moving the pin from the full-raise position to the locked position, actuating a diverting bracket from a first position to a second position.

18. The method of claim 14, further comprising:

in response to moving the pin from the full-raise position to the operating position, actuating a diverting bracket from a second position to a first position.

* * * * *